Patented Mar. 15, 1932

1,849,426

UNITED STATES PATENT OFFICE

RICHARD HERZ, OF FRANKFORT-ON-THE-MAIN, AND WERNER ZERWECK, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

PROCESS FOR MANUFACTURING CHLORINATED DERIVATIVES OF ANTHANTHRONE

No Drawing. Application filed August 10, 1928, Serial No. 298,866, and in Germany August 11, 1927.

Our present invention relates to a process of preparing chloro-anthanthrone compounds, more particularly it relates to a new process which allows the preparation of chlorinated anthanthrones in a very economical manner and in a pure state. Our new process comprises allowing chlorine to act on anthanthrone, dissolved in sulfuric acid containing some water, advantageously in sulfuric acid of about 85-95% strength.

The chlorination thus takes place quite smoothly. A further advantage of our new process is that the pure dyestuff obtained forms a crystalline sulfate which is almost insoluble in the sulfuric acid applied and separates when cold, whereas the by-products remain dissolved in the sulfuric acid mother liquor.

This process can advantageously be combined with the production of anthanthrone itself. In this case the condensation of the 1.1'-dinaphthyl-8.8'-dicarboxylic acid is carried out in sulfuric acid and without isolating the anthanthrone formed it is halogenated as described above after adding water to the solution until a sulfuric acid of about 85-95% strength results.

In order to further illustrate our invention the following examples are given, the parts being by weight and all temperatures in centigrade degrees; but we wish it to be understood that our invention is not limited to the examples given, nor to the exact conditions stated therein.

Example 1

1 part of anthanthrone is dissolved in 10 parts of concentrated sulfuric acid and the solution is mixed with water until a sulfuric acid of about 90% results. Then a chlorine carrier, such as iodine, iron, iron chloride, iron vitriol etc., may advantageously be added, and chlorine is allowed to pass in at 45-50° while well stirring, until the filtrate of a cooled test portion does not contain any more starting material. Thereafter the mass is cooled. The almost insoluble sulfate of the chlorinated anthanthrone which has separated in the form of violet black crystals is isolated in the usual manner, for instance by filtration or centrifugation, and washed with sulfuric acid of about 85%, until the filtrate becomes colorless. The thus obtained sulfate of dichloro-anthanthrone is soluble in concentrated sulfuric acid to a dark green solution, almost insoluble in sulfuric acid of about 80 to 95% strength and capable of being hydrolyzed by means of water, whereby sulfuric acid is split off and dichloro-anthanthrone is formed. In order to remove the adhering sulfuric acid and to hydrolize the sulfate the residue is introduced into water, washed till free from acid and dried. The dyestuff thus obtained corresponding probably to the formula:

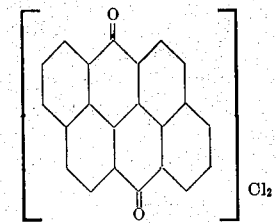

represents an orange powder, soluble in concentrated sulfuric acid with a clear green tint and dyeing the vegetable fiber from a violet hydrosulfite vat after hanging or soaping the dyeings a pure bright yellowish orange shade.

In order to combine the chlorination with the production of anthanthrone itself one works for instance as follows:

Example 2

1 part of 1.1'-dinaphthyl-8.8'-dicarboxylic acid (obtained for instance according to U. S. Patent No. 1,684,272) is introduced into 9 parts of sulfuric acid monohydrate and the mass is allowed to stand for some time. Hereby anthanthrone is produced, remaining in solution with a green tint. This solution is diluted with water until a sulfuric acid of about 90% results. Then the mass is treated with chlorine and thereafter worked up as described in Example 1. The dyestuff thus obtained is practically identical with that prepared according to Example 1.

We claim:

1. A process which comprises allowing chlorine to act on anthanthrone, dissolved in sulfuric acid of about 85–95% strength.

2. A process which comprises allowing chlorine to act on anthanthrone dissolved in sulfuric acid of about 85–95% strength until a dichloro product is formed.

3. A process which comprises allowing chlorine to act on anthanthrone dissolved in sulfuric acid of about 85 to 95% strength, separating the insoluble sulfate of chloroanthanthrone formed from the mother liquor and decomposing the said sulfate by means of water.

4. A process which comprises allowing chlorine to act on anthanthrone dissolved in sulfuric acid of about 85 to 95% strength until a dichloro product is formed, separating the insoluble sulfate of the dichloroanthanthrone from the mother liquor and decomposing the said sulfate by means of water.

5. A process which comprises allowing chlorine to act on anthanthrone dissolved in sulfuric acid of about 85 to 95% strength at a temperature of about 40 to 50° C. until a dichloro product is formed, separating the insoluble sulfate of the dichloroanthanthrone from the mother liquor and decomposing the said sulfate by means of water.

6. As a new product dichloroanthanthrone sulfate being a violetish black crystallized substance, soluble in concentrated sulfuric acid to a dark green solution, almost insoluble in sulfuric acid of about 80 to 95% strength and capable of being hydrolyzed by means of water and converted thereby to dichloroanthanthrone.

In testimony whereof, we affix our signatures.

RICHARD HERZ.
WERNER ZERWECK.